United States Patent Office 3,462,503
Patented Aug. 19, 1969

3,462,503
TELOMERIZATION OF ETHYLENE
Robert W. Rieve, Drexel Hill, Pa., assignor to Atlantic Richfield Company, Philadelphia, Pa., a corporation of Pennsylvania
No Drawing. Filed June 14, 1965, Ser. No. 463,902
Int. Cl. C07c 17/26
U.S. Cl. 260—658         17 Claims

ABSTRACT OF THE DISCLOSURE

Method for telomerization of ethylene by heating at super atmospheric pressures ethylene with carbon tetrachloride or a mixture of carbon tetrachloride and a chloromethane derivative in the presence of a catalyst consisting of an unsubstituted saturated organic acid anhydride of 4 to 20 carbon atoms, or an unsubstituted aliphatic saturated dicarboxylic acid having from 2 to 10 carbon atoms or an unsubstituted aliphatic saturated ketone having from 3 to 6 carbon atoms.

---

This invention relates to a method for the production of telomers of ethylene. More particularly this invention relates to a method for the production of either liquid or solid telomers of ethylene utilizing novel catalysts.

It has long been known that ethylene telomers can be produced by reacting ethylene with a chloromethane derivative such as carbon tetrachloride at elevated temperatures and pressures in the presence of a free-radical-initiator type catalyst such as benzoyl peroxide. It now has been found, however, that telomers may be obtained by reacting ethylene with at least one chloromethane derivative selected from the group consisting of carbon tetrachloride and mixtures of carbon tetrachloride with a lower chloromethane derivative at elevated temperatures and pressures in the presence of a catalyst which is not a free radical initiator type. The catalysts which have been found to be suitable for the production of telomers in accordance with this invention are certain saturated organic carbonyl group-containing compounds. These catalysts have the important advantage of providing a safe, non-explosive system as compared with the peroxide type catalyst systems.

It is an object of this invention therefore to provide a process for the telomerization of ethylene in the presence of a catalyst which provides a non-explosive system.

It is another object of this invention to provide a process for the production of ethylene telomers by reacting ethylene and a chloromethane derivative at elevated temperatures and pressures in the presence of a catalyst which contains a carbonyl group and is not a free-radical-initiator type.

Other objects of this invention will be apparent from the description and claims that follow.

This invention resides in the discovery that telomers of ethylene are obtained when ethylene and carbon tetrachloride or a mixture of carbon tetrachloride with a lower chloromethane derivative are reacted at elevated temperatures and pressures in the presence of catalytic amounts of certain saturated organic carbonyl group-containing compounds.

The saturated organic carbonyl group-containing compounds which are suitable as catalysts for the telomerization reaction of this invention are the unsubstituted aliphatic, saturated organic acid anhydrides of the acids having from 2 to 10 carbon atoms, i.e. the anhydrides may range from 4 to 20 carbon atoms in the molecule, the unsubstituted aliphatic saturated dicarboxylic acids having from 2 to 10 carbon atoms in the molecule and the unsubstituted aliphatic, saturated ketones having from 3 to 6 carbon atoms in the molecule. Examples of the unsubstituted aliphatic saturated organic acid anhydrides which are suitable are acetic anhydride, propionic anhydride, n-butyric anhydride, iso-butyric anhydride, n-valeric anhydride, iso-valeric anhydride, and the like including n-capric anhydride as well as 1,2-cyclohexane dicarboxylic anhydride and succinic anhydride.

Examples of suitable unsubstituted aliphatic saturated organic dicarboxylic acids are oxalic, malonic, succinic, glutaric, and the like including sebacic acid and also such acids as 1,2-cyclohexane dicarboxylic acid, 1,3-cyclohexane dicarboxylic acid and 1,4-cyclohexane dicarboxylic acid and the like. Examples of the unsubstituted aliphatic saturated ketones which are suitable are acetone, methyl ethyl ketone, diethyl ketone, methyl n-propyl ketone, methyl iso-propyl ketone, ethyl n-propyl ketone, ethyl iso-propyl ketone, methyl n-butyl ketone and methyl iso-butyl ketone.

Certain carbonyl group-containing compounds have been found to be unsuitable as catalysts for the production of telomers, for example the aliphatic saturated organic monobasic acids such as acetic acid and the unsaturated anhydrides and acids, for example phthalic anhydride, maleic anhydride, terephthalic acid and similar unsaturated compounds. In addition acetyl chloride and trichloro acetic acid have been found to be ineffective as catalysts for the production of telomers from ethylene and carbon tetrachloride.

The term "unsubstituted" as used herein to describe the catalysts means that the compounds do not contain other functional groups such as halogen, nitro, amino, and the like.

The halogen compounds which are utilized together with the ethylene to produce the telomers of this invention are chloromethane derivatives, specifically the highest chlorine containing derivative alone, carbon tetrachloride, or a mixture of the highest derivative with a lower chloromethane derivative, for example, a preferred mixture is carbon tetrachloride with chloroform. The other lower chloromethane derivatives are, of course, methylene chloride and chloromethane, however, mixtures of carbon tetrachloride with these are less preferred. When mixtures are employed, the carbon tetrachloride preferably ranges from about 0.1 to 10.0 mole percent of the mixture. Its role in the reaction apparently is that of an initiator so higher amounts may, of course, be employed but these serve only to produce mixtures of telomers and are not desired.

The reaction temperatures may range between about 100° C. and 250° C. or higher, preferably in the range from 120° C. to 200° C. The pressures may range from 1000 p.s.i. to 10,000 p.s.i. preferably from 2,000 p.s.i. to 5,000 p.s.i. The reaction may be carried out either discontinuously, i.e. in batches or continuously.

In general the reaction when carried out in batch has been found to be essentially complete after approximately four hours as shown by the pressure drop, however, some small loss in pressure is frequently observed for times ranging up to 16 to 18 hours or longer. In continuous runs reaction times of from ½ hour to 1 hour have been employed successfully, although times ranging up to 4 hours or longer also may be employed.

The reaction may be carried out in the presence of solvents or inert diluents, for example aliphatic or aromatic hydrocarbons such as n-hexane, isooctane, cyclohexane, benzene, or mixtures of these hydrocarbons such as the hydrocarbons boiling in the gasoline range. The use of a solvent, however, is not necessary and in general is not employed in the process of this invention.

The mole ratio of ethylene to the chloromethane derivative, i.e. carbon tetrachloride or mixture of carbon tetrachloride with the lower chloromethane derivative may range from 0.5:1 to 10:1 or higher, however, ratios from 2:1 to 4:1 are preferred. It has been found that liquid telomer products are obtained with ratios below 10:1 and mole ratios above about 10:1 produce solid telomers. The amount of catalyst ranges from 0.01 mole percent to 10.0 mole percent based on the moles of carbon tetrachloride, and ranges preferably from 0.05 mole percent to 5.0 mole percent based on the carbon tetrachloride.

The telomers are recovered from the reaction mixture by distilling to remove the ethylene and chloromethane derivative or derivatives. The catalyst is removed either by washing with water or if desired it can be recovered by distillation from the telomer product.

In order to illustrate various specific embodiments of the invention the following examples are provided with the understanding that the invention is not to be construed as being limited thereto.

EXAMPLE I

To a clean evacuated autoclave was charged 1.94 moles of carbon tetrachloride and 4.6 moles of ethylene. The autoclave was heated to 120° C. and held at this temperature for 18 hours. The pressure initially increased to 8000 p.s.i. then slowly decreased tot 6400 p.s.i. by the end of the 18 hours. It was found that 20 weight percent of the ethylene had reacted to give products which were telomers having from 3 to 13 carbon atoms. This experiment shows that about 20 percent conversion of the ethylene is obtained by thermal means alone in the absence of any added catalyst.

EXAMPLE II

The identical procedure in Example I was repeated except that 0.108 mole of acetic anhydride were added to the autoclave together with the carbon tetrachloride and ethylene. In 4 hours the pressure fell from 8900 p.s.i. to 1600 p.s.i. at a reaction temperature of 120° C. It was found that there had been obtained an 82 weight percent conversion of the ethylene and that the products were telomers having from 3 to 13 carbon atoms. In Table I there is set forth the analysis of the product obtained in Examples I and II.

TABLE I

| Telomer | Wt. percent of product | |
|---|---|---|
| | Ex. I | Ex. II |
| $Cl_3CCH_2CH_2Cl$ | 5.2 | 7.0 |
| $Cl_3C(CH_2CH_2)_2Cl$ | 41.8 | 44.7 |
| $Cl_3C(CH_2CH_2)_3Cl$ | 30.3 | 30.1 |
| $Cl_3C(CH_2CH_2)_4Cl$ | 16.1 | 13.0 |
| $Cl_3C(CH_2CH_2)_5Cl$ | 6.0 | 4.4 |
| $Cl_3C(CH_2CH_2)_6Cl$ | 0.6 | 0.8 |

It will be seen from the data set forth in the table that essentially the same product distribution is obtained by thermal telomerization and catalytic telomerization, however the catalytic reaction gives four times the conversion in one-fourth the time.

EXAMPLE III

The reaction of ethylene and carbon tetrachloride was carried out in a continuous flow reactor by charging the carbon tetrachloride containing 6.7 volume percent acetic anhydride to a reactor tube having an inside diameter of approximately 1.25 inches and a 264.5 ml. void volume at a rate of 50.0 ml. per hour with the ethylene being simultaneously introduced at a rate of 600 ml. per minute to give a mole ratio of ethylene to carbon tetrachloride of 3:1. At a reaction temperature of 170° C. and 4500 p.s.i. there was obtained a 25.2 weight percent conversion of the carbon tetrachloride to telomer product having a product distribution shown in Table II.

EXAMPLE IV

The effluent product from Example III was passed through the reactor at the same reaction conditions as in Example III without any additional acetic anhydride catalyst or carbon tetrachloride being added, but sufficient ethylene being added to give the 3:1 mole ratio of ethylene to carbon tetrachloride. The conversion of carbon tetrachloride increased to 44.4 weight percent, the product distribution is shown in Table II.

EXAMPLE V

The effluent products from Example IV were passed through the same tubular reactor at the same temperature and pressure as in Examples III and IV with no acetic anhydride or carbon tetrachloride being added, but sufficient ethylene being added to give the 3:1 mole ratio of ethylene to carbon tetrachloride. The conversion of the carbon tetrachloride increased to 56.3 weight percent, the product distribution being shown in Table II. It will be seen from Examples III, IV and V that the telomerization reaction may be carried out continuously and that the products may be recycled until extremely high conversions are attained since the acetic anhydride catalyst is not destroyed by the reaction. Moreover, the product distribution is not changed when the products are recycled and the mole ratio of ethylene to carbon tetrachloride is maintained either by the addition of one or both of the reactants.

EXAMPLE VI

A continuous telomerization run was carried out with ethylene and carbon tetrachloride in the same reactor employed in Examples III, IV and V except that the amount of catalyst was only 1.7 volume percent of the carbon tetrachloride. A temperature of 200° C. and a pressure of 4500 p.s.i. was employed. A conversion of 33.0 weight percent of the carbon tetrachloride was obtained which is higher than for Example III because of the higher temperature. This experiment demonstrates that low catalyst concentrations may be employed. The product distribution is shown in Table II.

TABLE II

| Telomer | Wt. percent of product in Example | | | |
|---|---|---|---|---|
| | III | IV | V | VI |
| $Cl_3CCH_2CH_2Cl$ | 4.3 | 3.7 | 3.9 | 5.1 |
| $Cl_3C(CH_2CH_2)_2Cl$ | 32.5 | 30.9 | 32.5 | 32.3 |
| $Cl_3C(CH_2CH_2)_3Cl$ | 29.5 | 30.3 | 30.7 | 31.1 |
| $Cl_3C(CH_2CH_2)_4Cl$ | 19.1 | 19.9 | 19.9 | 17.0 |
| $Cl_3C(CH_2CH_2)_5Cl$ | 9.9 | 11.0 | 9.0 | 9.8 |
| $Cl_3C(CH_2CH_2)_6Cl$ | 4.1 | 3.4 | 3.9 | 4.6 |
| $Cl_3C(CH_2CH_2)_nCl_1$ | 0.6 | | | |
| Unidentified compounds | | 0.8 | | |

[1] $n$ is 7 and higher.

It will be seen that substantially the same product distribution is obtained when the effluent from Example III was recycled as shown by the results for Examples IV and V. Similarly, when a lower catalyst concentration was employed the same product distribution was obtained. Moreover, the product distribution obtained in the continuous runs are very similar to those in the batch runs except that there are smaller amounts of the $C_5$ and $C_7$ telomers and somewhat higher amounts of the $C_{11}$ and $C_{13}$ telomers.

EXAMPLE VII

There was charged to a clean, evacuated autoclave 3.1 moles of carbon tetrachloride, 2.9 moles of ethylene and 0.2 mole of propionic anhydride. The temperature was raised to 120° C. for 21 hours and at the end of this time 66 weight percent of the ethylene had reacted to give the following telomers in weight percent: 25.9 of $Cl_3CCH_2CH_2Cl$ 55.2 of $Cl_3C(CH_2CH_2)_2Cl$ and 19.2 of $Cl_3C(CH_2CH_2)_3Cl$ and higher telomers.

EXAMPLE VIII

A clean evacuated autoclave was charged with 3 moles of carbon tetrachloride, 0.1 moles of maleic anhydride and 3 moles of ethylene. The temperature was raised to 120° C. to a maximum pressure of 8850 p.s.i. It was held at this temperature for 18 hours. At the end of 18 hours the pressure was 8500 pounds. When the contents of the autoclave were distilled it was found that no product telomers had been formed showing that maleic anhydride is not a catalyst for the reaction. In an identical experiment 0.0675 moles of phthalic anhydride were substituted for the maleic anhydride as the catalyst and the reaction was run for 18 hours at 120° C. At the end of that time it was found upon distillation of the contents of the autoclave that no product telomers had been formed, showing that phthalic anhydride is not a catalyst for the reaction. In similar experiments with the same amounts of reactants but utilizing terephthalic acid, acetic acid, acetyl chloride, and trichloroacetic acid as catalysts in amounts between 0.05 and 0.2 moles, no telomerization was obtained.

EXAMPLE IX

A series of runs was carried out similar to those of Example VIII in each run utilizing a clean evacuated autoclave. The charge in each run was approximately 3 moles of carbon tetrachloride and 3 moles of ethylene with from 0.1 to 0.2 moles of the catalyst. The various catalysts which were employed were succinic anhydride; 1,2-cyclohexane dicarboxylic anhydride; malonic acid; succinic acid; 1,2-cyclohexane dicarboxylic acid; 1,3-cyclohexane dicarboxylic acid and 1,4-cyclohexane dicarboxylic acid. Temperatures of 120° C. were utilized with reaction times in the range of from 16 to 18 hours. Maximum pressures obtained were of the order of 8500 to 9500 p.s.i. With each of these catalysts, telomerization was obtained with a product distribution essentially the same as that obtained in Examples I and II.

EXAMPLE X

A clean evacuated autoclave was charged with 3 moles of carbon tetrachloride, 2.8 moles of ethylene and 0.415 moles of methyl ethyl ketone. The temperature was raised to 120° C. and held at this level for 17 hours. A maximum pressure of 6100 p.s.i. was obtained and at the end of the reaction time a final pressure of 2250 pounds had been reached. There was obtained 123 grams of telomer product which had a product distribution essentially the same as that obtained in Examples I and II.

EXAMPLE XI

To a clean evacuated autoclave was charged 0.05 moles of carbon tetrachloride. 1.2 moles of ethylene and 0.48 moles of acetic anhydride. The mole ratio of ethylene to carbon tetrachloride was thus 24:1. The temperature was raised to 120° C. and held at this level for 19 hours. A maximum pressure of 7600 p.s.i. was attained. At the end of the 19 hours the reactor was depressurized and a solid telomer product recovered. In general it has been found that solid telomers are obtained when mole ratios of ethylene to carbon tetrachloride above 10:1 are employed, however, it is preferred not to employ ratios above about 30:1 of ethylene to carbon tetrachloride since the carbon tetrachloride at these high mole ratios is at such a low concentration that it becomes difficult to form the telomer product.

EXAMPLE XII

To a clean evacuated autoclave was charged 3.0 moles of chloroform, 0.03 moles of carbon tetrachloride, 0.27 moles of acetic anhydride and 3.1 moles of ethylene. The temperature was raised to about 150° C. and held at this temperature for 13 hours. The pressure initially increased to 8600 p.s.i. then slowly decreased to 7480 p.s.i. There was obtained 452 grams of liquid telomers which were trichloroparaffins.

I claim:
1. The process for the production of telomers which comprises heating ethylene with at least one chloromethane derivative selected from the group consisting of carbon tetrachloride and mixtures of carbon tetrachloride with a lower chloromethane derivative at a temperature of from 100° C. to 250° C. at a pressure of from 1000 p.s.i. to 10,000 p.s.i. the mole ratio of ethylene to said chloromethane derivative being at least 0.5:1 in the presence of an organic carbonyl group-containing compound selected from the group consisting of unsubstituted aliphatic saturated carboxylic acid anhydrides having from 4 to 20 carbon atoms in the molecule, unsubstituted aliphatic saturated dicarboxylic acids having from 2 to 10 carbon atoms in the molecule and unsubstituted aliphatic saturated ketones having from 3 to 6 carbon atoms in the molecule, the amount of organic carbonyl group-containing compound ranging from 0.01 mole percent to 10.0 moles percent based on said chloromethane derivative.

2. The process according to claim 1 wherein the mole ratio of ethylene to said chloromethane derivative is in the ratio of from 0.5:1 to 10:1 and the telomers produced are liquid.

3. The process according to claim 1 wherein the mole ratio of ethylene to said chloromethane derivative is greater than 10:1 and the telomers produced are solid.

4. The process according to claim 1 wherein the chloromethane derivative is carbon tetrachloride.

5. The process according to claim 1 wherein the chloromethane derivative is a mixture of carbon tetrachloride and chloroform.

6. The process for the production of telomers which comprises heating ethylene with at least one chloromethane derivative selected from the group consisting of carbon tetrachloride and mixtures of carbon tetrachloride with a lower chloromethane derivative at a temperature of from 120° C. to 200° C. at a pressure of from 1000 p.s.i. to 10,000 p.s.i. the mole ratio of ethylene to said chloromethane derivative being at least 0.5:1 in the presence of an unsubstituted aliphatic saturated carboxylic acid anhydride having from 4 to 20 carbon atoms in the molecule in an amount ranging from 0.01 mole percent to 10.0 mole percent based on the chloromethane derivative.

7. The process according to claim 6 wherein the acid anhydride is acetic anhydride.

8. The process according to claim 6 wherein the acid anhydride is propionic anhydride.

9. The process according to claim 6 wherein the acid anhydride is succinic anhydride.

10. The process according to claim 6 wherein the acid anhydride is 1,2-cyclohexane dicarboxylic anhydride.

11. The process for the production at telomers which comprises heating ethylene with at least one chloromethane derivative selected from the group consisting of carbon tetrachloride and mixtures of carbon tetrachloride with a lower chloromethane derivative at a temperature of from 120° C. to 200° C. at a pressure of from 1000 p.s.i. to 10,000 p.s.i. the mole ratio of ethylene to said chloromethane derivative being at least 0.5:1 in the presence of an unsubstituted aliphatic saturated dicarboxylic acid having from 2 to 10 carbon atoms in the molecule in an amount ranging from 0.01 mole percent to 10.0 mole percent based on the chloromethane derivative.

12. The process according to claim 11 wherein the dicarboxylic acid is malonic acid.

13. The process according to claim 11 wherein the dicarboxylic acid is succinic acid.

14. The process according to claim 11 wherein the dicarboxylic acid is one of the three cyclohexane dicarboxylic acid isomers.

15. The process for the production of telomers which comprises heating ethylene with at least one chloromethane derivative selected from the group consisting of carbon tetrachloride and mixtures of carbon tetrachloride with a lower chloromethane derivative at a temperature of from 120° C. to 200° C. at a pressure of from 1000 p.s.i. to 10,000 p.s.i. the mole ratio of ethylene to said chloromethane derivative being at least 0.5:1 in the presence of an unsubstituted aliphatic saturated ketone having from 3 to 6 carbon atoms in the molecule in an amount ranging from 0.01 mole percent to 10.0 mole percent based on the chloromethane derivative.

16. The process according to claim 15 wherein the ketone is methyl ethyl ketone.

17. The process for the continuous production of telomers which comprises passing ethylene with at least one chloromethane derivative selected from the group consisting of carbon tetrachloride and mixtures of carbon tetrachloride with a lower chloromethane derivative at a mole ratio in the range of from 0.5:1 to 10:1 through a reaction zone at a temperature of from 100° C. to 250° C., at a pressure of from 1000 p.s.i. to 10,000 p.s.i. in the presence of an organic carbonyl group-containing compound selected from the group consisting of unsubstituted aliphatic saturated carboxylic acid anhydrides having from 4 to 20 carbon atoms in the molecule, unsubstituted aliphatic saturated dicarboxylic acids having from 2 to 10 carbon atoms in the molecule and unsubstituted aliphatic saturated ketones having from 3 to 6 carbon atoms in the molecule, the amount of organic carbonyl group-containing compound ranging from 0.01 mole percent to 10.0 mole percent based on said chloromethane derivative.

References Cited

UNITED STATES PATENTS

| 2,182,617 | 12/1939 | Michel. |
| 2,440,800 | 5/1948 | Hanford et al. |
| 2,468,208 | 4/1949 | Kharasch. |
| 2,907,805 | 10/1959 | Bestian et al. |
| 3,213,149 | 10/1965 | Takahashi et al. |

FOREIGN PATENTS

| 1,363,094 | 4/1964 | France. |

LEON ZITVER, Primary Examiner

J. BOSKA, Assistant Examiner